United States Patent
Judka et al.

(10) Patent No.: US 8,195,771 B2
(45) Date of Patent: Jun. 5, 2012

(54) METHOD AND APPARATUS FOR THE CONFIGURATION OF NETWORK ELEMENTS

(75) Inventors: Jeffrey Judka, Barnegat, NJ (US); Ho-Keung Lee, Brooklyn, NY (US)

(73) Assignee: Alcatel Lucent, Paris (FR)

(*) Notice: Subject to any disclaimer, the term of this patent is extended or adjusted under 35 U.S.C. 154(b) by 2322 days.

(21) Appl. No.: 10/452,270

(22) Filed: Jun. 2, 2003

(65) Prior Publication Data
US 2004/0255009 A1 Dec. 16, 2004

(51) Int. Cl.
*G06F 15/177* (2006.01)

(52) U.S. Cl. ....................................... 709/220

(58) Field of Classification Search ................... 709/220
See application file for complete search history.

(56) References Cited

U.S. PATENT DOCUMENTS

| | | | | |
|---|---|---|---|---|
| 5,828,851 | A * | 10/1998 | Nixon et al. | 710/105 |
| 6,584,421 | B1 * | 6/2003 | Clarridge et al. | 702/85 |
| 6,584,499 | B1 * | 6/2003 | Jantz et al. | 709/220 |
| 6,741,262 | B1 * | 5/2004 | Munson et al. | 345/594 |
| 2003/0192039 | A1 * | 10/2003 | McConnell | 717/171 |
| 2003/0206646 | A1 * | 11/2003 | Brackett | 382/128 |
| 2003/0212773 | A1 * | 11/2003 | Sullivan | 709/221 |

* cited by examiner

*Primary Examiner* — Hussein A. Elchanti
(74) *Attorney, Agent, or Firm* — Wall & Tong, LLP

(57) ABSTRACT

A method for the configuration of network elements includes initially configuring a network element via a controller. The controller characterizes (learns) the configuration steps as a series of menu driven screen commands associated with the network element and processes subsequent substantially similar configuration requests for the network element and other network elements of the network using the characterized series of menu driven screen commands to execute the subsequent configuration requests. As such, the configuration and set-up of new network element(s) or the subsequent modifications to the configuration of existing network element(s), are vastly simplified processes. The present invention advantageously reduces the number of needed manually input parameters, thus making the configuration of network elements more reliable.

19 Claims, 3 Drawing Sheets

METHOD AND APPARATUS FOR THE CONFIGURATION OF NETWORK ELEMENTS

FIELD OF THE INVENTION

This invention relates to the field of communication networks and, more specifically, to the configuration of network elements in communication networks.

BACKGROUND OF THE INVENTION

Management systems are used to configure craft and/or menu driven devices, such as network elements, in a communication network. In conventional management systems, each network element must be configured manually. That is, a network engineer (e.g. an installer) must manually log onto a network manager and send a set of commands to each of the network elements that is to be configured. Alternatively, network engineers may configure network elements by locally attaching a terminal to each of the network element's craft interfaces, and manually configure the network elements. In either case, it is apparent that in conventional management systems the network elements are required to be configured manually. Such configuration methods are extremely costly and time consuming.

Moreover, network elements typically require a plurality of distinct sets of instructions for configuration to bring them into proper operation. Various network elements may operate using different operational support systems (OSS) that require complex commands for the configuration of existing or new network elements. As disclosed above, these complex commands are typically entered manually, which can and has resulted in human error leading to system outages and installation delays. In addition, the numbers of commands required for configuration of a network element can be very large increasing the chances of input errors.

Configuration of craft and/or menu driven equipment, such as network elements, typically requires network engineers to be very knowledgeable. As such, these network engineers must undergo extensive training at a considerable expense of both time and money. Additionally, despite the best training efforts, network engineers are still very susceptible to making errors when entering configuration information resulting in delays and additional expense.

SUMMARY OF THE INVENTION

The present invention advantageously provides a novel method and system for the configuration of network elements.

In one embodiment of the present invention, a method includes initially configuring a network element via a controller. The controller characterizes the configuration steps as a series of menu driven screen commands associated with the network element and processes subsequent substantially similar configuration requests for the network element and other network elements of the network using the characterized series of menu driven screen commands to execute the subsequent configuration requests. The method further includes identifying for which network element(s) the subsequent configuration requests are intended.

In another embodiment of the present invention, a controller for automatically configuring network elements includes a processor and a memory. The controller is adapted to perform the steps of characterizing, from an initial configuration of a network element, the configuration steps as a series of menu driven screen commands associated with the network element, and processing subsequent substantially similar configuration requests for the network element and other network elements of the network by identifying for which network element(s) the subsequent configuration requests are intended and using the characterized series of menu driven screen commands to execute the subsequent configuration requests.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and system for the configuration of network elements. Although embodiments of the present invention will be described with respect to the implementation of a VT100 terminal, it will be appreciated by those skilled in the art and informed by the teachings of the present invention, that the concepts of the present invention may be applied in other menu driven applications that support both standardized and non-standardized management protocols.

The present invention addresses the problem of effectively and accurately configuring a network element while minimizing human error. As noted above, conventional network management systems require manual configuration of network elements. As such, a user cannot configure the various network elements in an optimal fashion. This has lead to inconsistent configurations and in many cases, improperly configured network elements. Improperly configured network elements can lead to expensive repairs, loss of customer satisfaction and loss of revenue for the service provider.

Figure 1:
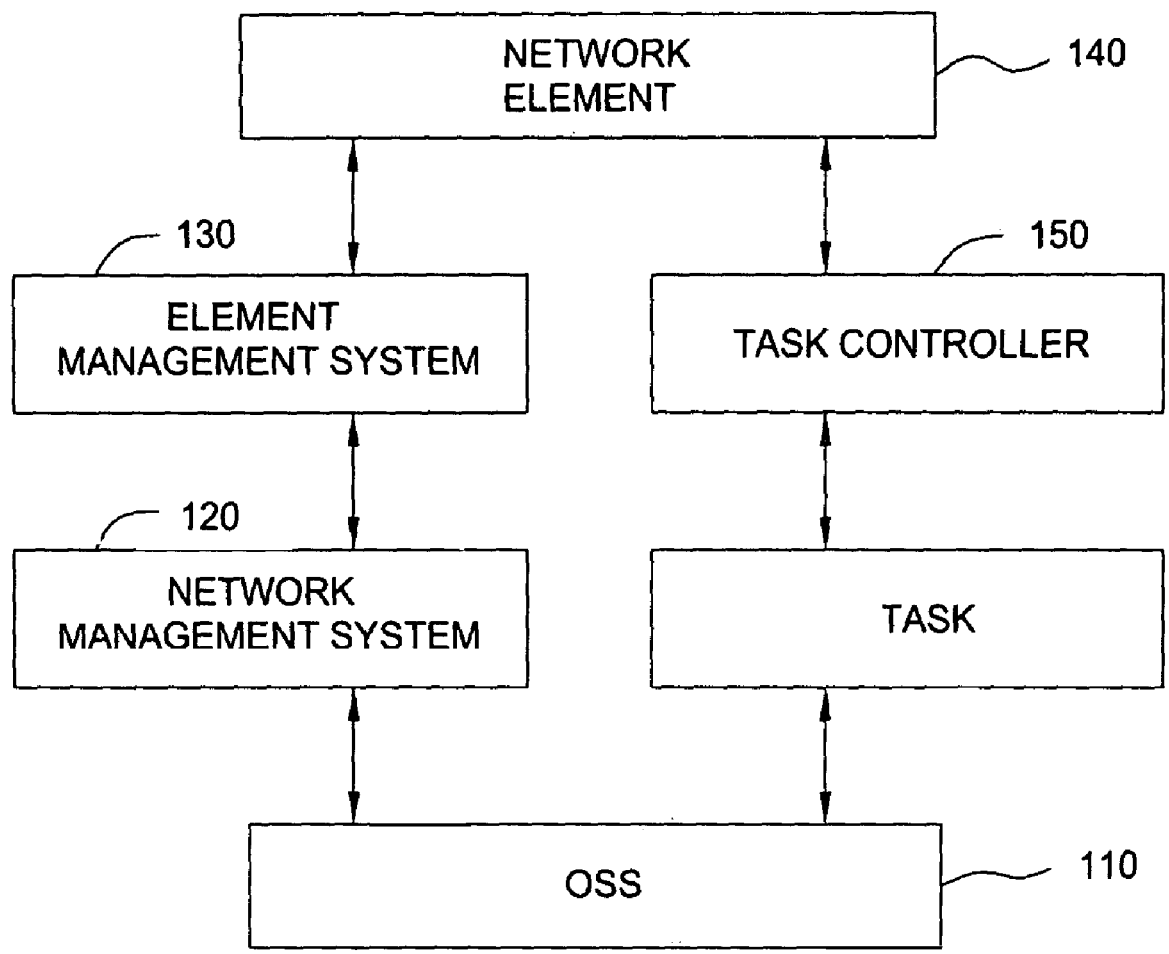
FIG. 1 depicts a high level block diagram of an embodiment of a management system in accordance with the present invention.

FIG. 1 depicts a high level block diagram of an embodiment of a management system in accordance with the present invention. The management system 100 comprises an operational support system (OSS) 110, a network management system (NMS) 120, an element management system (EMS) 130, a network element 140, and a task controller 150. In general, the OSS 110 is involved in the operation of an entire network, hence, having to support different classes of network elements such as ATM, IP, Optical and Wireless Equipments. The NMS 120, on the other hand, is specialized to support only one class of network element as the network element 140. The EMS 130 specializes its function even more by supporting only a subset of network elements within its type. However, the EMS 130 may provide more functions specific to the network element not supported by the NMS 120 or OSS 110.

Figure 2:
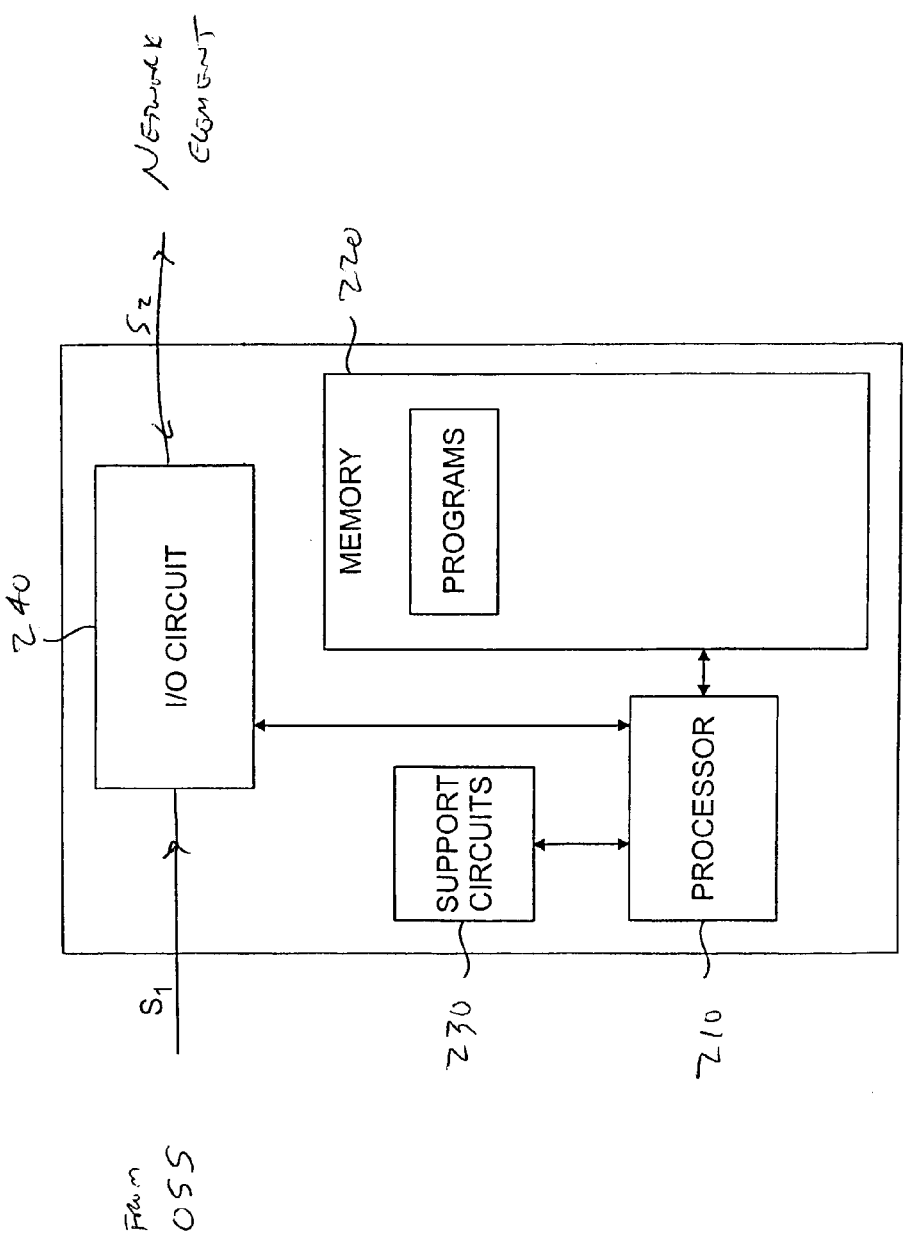
FIG. 2 depicts a high level block diagram of an embodiment of a task controller suitable for use in the management system of FIG. 1.

FIG. 2 depicts a high level block diagram of an embodiment of a task controller 150 suitable for use in the management system 100 of FIG. 1. The task controller 150 of FIG. 2 comprises a processor 210 as well as a memory 220 for storing control programs and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The task controller 150 also contains input-output circuitry 240 that forms an interface between the various functional elements communicating with the task controller 150. For example, in the embodiment of FIG. 1, the task controller 150 communicates with the OSS 110 via a signal path S1 and with the network element 140 via a signal path S2.

Although the task controller 150 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Referring back to FIG. 1, the OSS 110 operates to generate tasks, which include instructions, to achieve a desired result within the management system 100. Initially, the OSS 110 is programmed by a system engineer to perform the required tasks for configuring the network element 140 and bringing the network element 140 on-line. That is, a system engineer programs the OSS 110 to perform tasks for the initialization and configuration of network elements. The initial programming of the OSS 110 by the system engineer may prove to be a complex and time consuming task. More specifically, the first time a configuration routine is performed on a network element, the steps for performing the configuration have to be input by a programmer (e.g., the system engineer). These steps may be very time consuming to enter, perform and execute. The configuration routine is communicated to the network element 140 of the management system 100 via the task controller 150. The task controller 150 characterizes (learns) and records the configuration steps as a series of menu driven screen commands associated with the network element being programmed. This process is described in further detail below.

When programming the configuration routines of the OSS 110, the system engineer specifies provisionable parameters within the program that are to be used as identification parameters. These parameters are variable parameters that are to be entered by a user upon prompting by the task controller 150 for specifying a network element on which a requested task will be performed. Such site-specific parameters and equipment-specific parameters will be described in further detail below.

During subsequent task (configuration) requests by a user, the task controller 150 uses the received request to automatically generate a series of instructions that allow it to navigate through a series of menu screens of the network element 140. More specifically, a user loads a task request that was previously programmed by a system engineer into the task controller 150. Upon loading a task request, the user is prompted by the task controller 150 for site-specific and/or equipment-specific parameters upon identification by the task controller 150 of the requested task. That is, if a user wishes to perform a task upon a specific network element, such as network element 140 of FIG. 1, the user gets prompted by the task controller 150 to input a provisionable parameter (e.g., the site-specific and equipment-specific parameters), if necessary, to identify for which network element a task request is intended. Some site-specific and equipment-specific parameters may include IP Address/Network configuration settings, Port Configuration for its Management Ports, or any provisionable parameters that is needed for the configuration of a network element.

Upon receiving the requested specific parameters input by the user, the task controller 150 initializes, illustratively, COM Port settings and begins communicating with the network element 140. Although in FIG. 1, the task controller 150 is depicted as communicating with the network element 140 via a COM port, a task controller in accordance with the present invention may use any known communications methods to communicate with a network element including serial or TCP/IP interfacing.

Upon establishing communication with the network element 140, the task controller 150 generates a series of instructions that allow the task controller 150 to navigate through a series of menu screens of the network element 140, such as menu screens of a VT100 terminal, for performing the task(s) requested by the user. More specifically, the task controller 150 identifies the requested task as a previously characterized (learned) series of menu commands and performs the requested task as a series of menu commands. A task controller in accordance with the present invention may implement means having pattern matching capabilities on menu driven screens, such as ActivePerl Tk and common components of workstation operating systems, to learn the series of menu commands for performing tasks.

In operation, the task controller 150 determines if it is currently on the right menu item in the screen for performing the requested task. If so, the task controller 150 performs the action indicated by the requested task. If not, the task controller 150 continues to search the menu for more menu items until it finds the menu item corresponding to the requested task.

After completion of the requested task, the task controller 150 determines if any other tasks need to be performed. That is, the task controller 150 checks to see if any other task requests have been loaded by a user.

Although the task controller 150 of FIG. 1 is depicted as being in communication with a single network element 150, in other embodiments of the present invention, a task controller of the present invention is in communication with a plurality of network elements for performing requested task on each of the network elements as describe above for the network element 150. In addition, although the task controller 150 of FIG. 1 is depicted as being in communication with a single OSS 110, in other embodiments of the present invention, a task controller of the present invention is in communication with a plurality of OSS for receiving task request from a plurality of users on said plurality of OSS and executing the task requests on the intended network elements as describe above.

Furthermore, once a configuration routine has been programmed by a system engineer and characterized (learned) by a task controller in accordance with the present invention, the characterized series of menu driven screen commands may be used to perform a learned task request on other network elements comprising substantially similar menu driven tasks. More specifically and referring back to FIG. 1, a configuration request programmed by the system engineer for the network element 140 and learned by the task controller 150 as a series of menu driven screen commands, may be used to perform subsequent substantially similar configuration requests for other network elements in communication with the management system 100.

Figure 3:
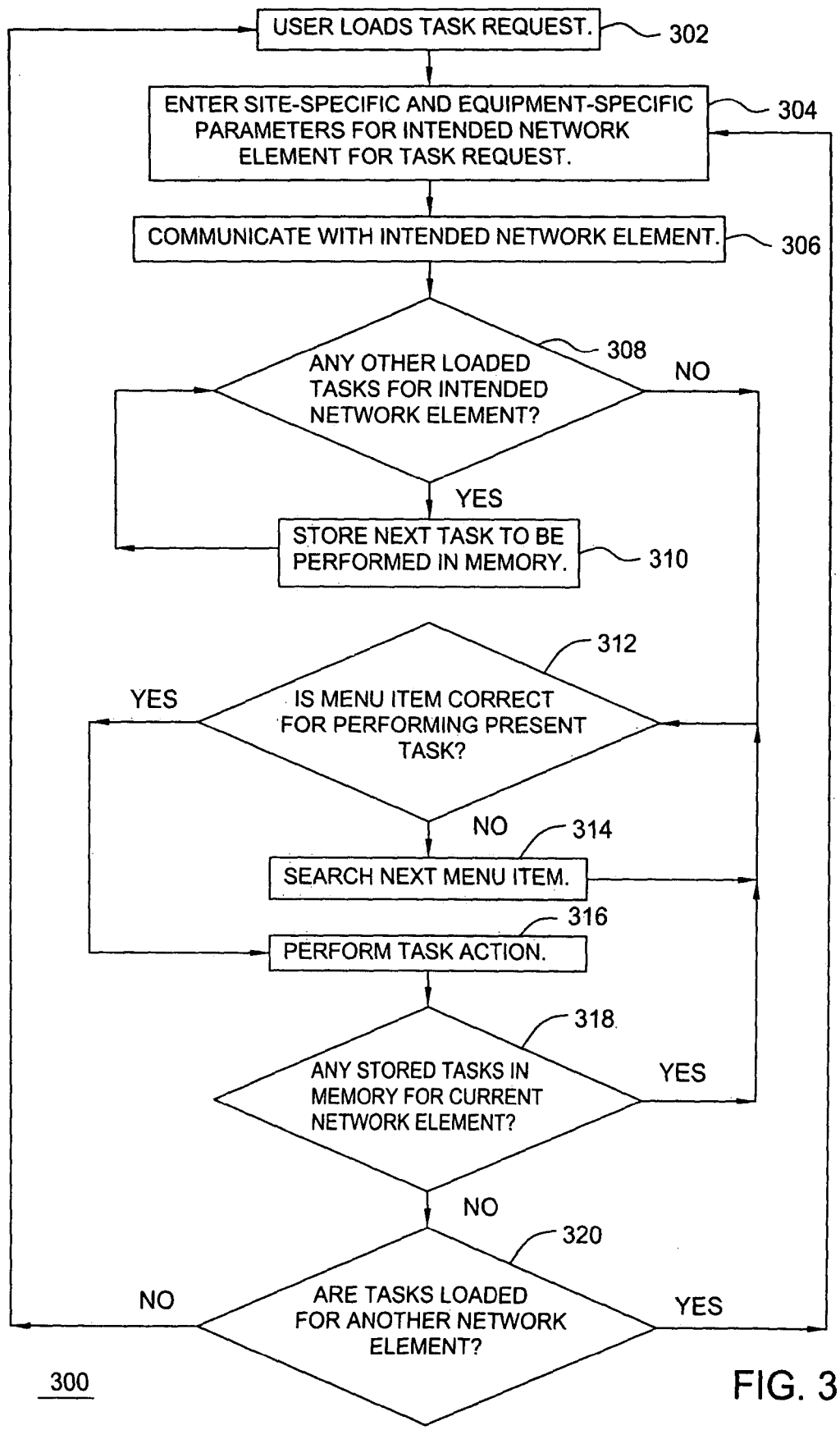
FIG. 3 depicts a flow chart of an embodiment of a method of the present invention.

FIG. 3 depicts a flow chart of an embodiment of a method for automatically configuring network elements in accordance with the present invention. The method 300 of FIG. 3 is entered at step 302 wherein a user loads a task request. The method 300 then proceeds to step 304.

At step 304, the method 300 prompts the user to enter site-specific and equipment-specific parameters to identify a network element for which the task request is intended. The method 300 then proceeds to step 306.

At step 306, the method 300 initializes communication parameters and begins communications with the intended network element. The method 300 then proceeds to step 308.

At step 308, the method 300 determines if there any other tasks loaded for the intended network element. If there are more tasks to be performed for the intended network element, the method 300 proceeds to step 310. If no other tasks are to be performed on the intended network element, the method 300 proceeds to step 312.

At step 310, the method 300 stores the next task, to be performed after the previous task is completed, in a memory. The method 300 then returns to step 308.

At step 312, the method 300 parses data from a menu or craft interface of the network element to determine if the current menu item is the correct menu item for performing the loaded task. If the menu item is not correct, the method 300 proceeds to step 314. If the menu item is correct, the method 300 proceeds to step 316.

At step 314, the method 300 interacts with the menu screen to search a next menu item. The method then returns to step 312.

At step 316, the method 300 performs the action defined by the loaded task. The method 300 then proceeds to step 318.

At step 318, the method 300 checks a memory to determine if any tasks have been stored. If other tasks to be performed on the intended network element, the method 300 returns to step 312. If no other tasks to be performed for the intended network element exist in the memory, the method 300 proceeds to step 320.

At step 320, the method 300 determines if any loaded tasks exist for another network element. If no tasks exist for another network element, the method 300 returns to step 302 and awaits another request from a user. If a task exists for another network element, the method 300 returns to step 304.

In accordance with the present invention, the configuration and set-up of a new network element(s) or the subsequent modifications to the configuration of an existing network element (s), such as network element 140 of FIG. 1, are vastly simplified processes. Embodiments of the present invention are used for installing or modifying new or existing networks elements that use menu or craft interfaces, such as VT100, without needing to have a deep understanding of a subject network element or its OSS. The present invention advantageously reduces the number of needed manually input parameters, thus making the configuration of network elements more reliable.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for automatically configuring network elements of a network, comprising:
configuring a network element via a controller using a plurality of configuration steps associated with a configuration request;
characterizing the configuration steps as a series of menu-driven screen commands associated with the network element, wherein the series of menu-driven screen commands is adapted to enable the controller to navigate menu screens of the network element;
storing the characterized series of menu-driven screen commands; and
processing subsequent similar configuration requests for said network element and other network elements of said network via said controller using the characterized series of menu-driven screen commands to execute said subsequent similar configuration requests.

2. The method of claim 1, further comprising:
identifying for which network elements the subsequent configuration requests are intended.

3. The method of claim 2, wherein the network elements for which the subsequent configuration requests are intended are identified by prompting a user to input identification parameters for the intended network elements.

4. The method of claim 3, wherein said identification parameters comprise site-specific and equipment-specific parameters of the intended network elements.

5. The method of claim 1, wherein said controller characterizes the configuration steps of a plurality of configuration routines and processes subsequent similar configuration requests using the respective characterized menu-driven screen commands for executing said plurality of configuration routines.

6. The method of claim 1, wherein configuration of the network element using the configuration steps is performed by a network engineer.

7. The method of claim 1, wherein subsequent configuration requests substantially only require a user to input site-specific and equipment-specific parameters for identifying the intended network elements.

8. The method of claim 1, wherein the network element is initially configured via an operational support system and configuration information is communicated to the network element via said controller.

9. A controller comprising a processor and a memory, for automatically configuring network elements of a network, said controller configured to:
characterize a plurality of configuration steps from a configuration of a network element as a series of menu-driven screen commands associated with said network element, wherein the configuration steps are associated with a configuration request, wherein the series of menu-driven screen commands is adapted to enable the controller to navigate menu screens of the network element;
store the characterized series of menu-driven screen commands; and
process subsequent similar configuration requests for said network element and other network elements of said network via said controller using the characterized series of menu-driven screen commands to execute said subsequent similar configuration requests.

10. The controller of claim 9, wherein said controller is further configured to prompt a user to enter identification parameters for identifying for which network elements the subsequent configuration requests are intended.

11. The controller of claim 10, wherein said identification parameters comprise site-specific and equipment-specific parameters of the intended network elements.

12. The controller of claim 9, wherein said controller is configured to characterize the configuration steps of a plurality of configuration routines and process subsequent substantially similar configuration requests using the respective characterized menu-driven screen commands for executing said plurality of configuration routines.

13. The controller of claim 9, wherein the network element is initially configured via an operational support system and configuration information is communicated to the network element via said controller.

14. The controller of claim 9, wherein the configuration of the network element is performed by a network engineer.

15. The controller of claim 9, wherein configuration requests are stored in said memory until they are executed by said controller.

16. A non-transitory computer-readable storage medium storing a set of instructions which, when executed by a processor, cause the processor to perform a method comprising:
   characterizing a plurality of configuration steps from a configuration of a network element as a series of menu-driven screen commands associated with said network element, wherein the configuration steps are associated with a configuration request, wherein the series of menu-driven screen commands is adapted to enable the controller to navigate menu screens of the network element;
   storing the characterized series of menu-driven screen commands; and
   processing subsequent similar configuration requests for said network element and other network elements using the characterized series of menu-driven screen commands to execute said subsequent similar configuration requests.

17. The non-transitory computer-readable storage medium of claim 16, further performing:
   identifying for which network elements the subsequent configuration requests are intended.

18. The non-transitory computer-readable storage medium of claim 17, wherein the network elements for which the subsequent configuration requests are intended are identified by prompting a user to input identification parameters for the intended network elements.

19. The non-transitory computer-readable storage medium of claim 18, wherein said identification parameters comprise site-specific and equipment-specific parameters of the intended network elements.

* * * * *